(12) United States Patent
Beemanapalli et al.

(10) Patent No.: US 12,405,967 B2
(45) Date of Patent: Sep. 2, 2025

(54) SYSTEM AND METHOD FOR GENERATING A NETWORK GRAPH FROM ANALYTIC ARTIFACTS IN AN ANALYTICS ENVIRONMENT

(71) Applicant: Oracle International Corporation, Redwood Shores, CA (US)

(72) Inventors: Kalyan Beemanapalli, Eden Prairie, MN (US); Gustavo Alejandro Cruz Silva, Jalisco (MX); Nikhil Surve, Pleasanton, CA (US); Kaijing Hu, Wuhan (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/697,705

(22) Filed: Mar. 17, 2022

(65) Prior Publication Data

US 2023/0297586 A1 Sep. 21, 2023

(51) Int. Cl.
*G06F 16/26* (2019.01)
*G06F 16/25* (2019.01)
*G06F 16/28* (2019.01)

(52) U.S. Cl.
CPC .......... *G06F 16/26* (2019.01); *G06F 16/254* (2019.01); *G06F 16/283* (2019.01)

(58) Field of Classification Search
CPC ....... G06F 16/26; G06F 16/283; G06F 16/254
See application file for complete search history.

(56) References Cited

U.S. PATENT DOCUMENTS

| | | | |
|---|---|---|---|
| 9,172,621 B1* | 10/2015 | Dippenaar | H04L 41/0879 |
| 2020/0169565 A1* | 5/2020 | Badawy | G06F 21/552 |
| 2021/0019325 A1* | 1/2021 | Edge | G06F 16/953 |
| 2022/0188689 A1* | 6/2022 | Gunawardana | G06N 5/022 |
| 2023/0032686 A1* | 2/2023 | Williams | G06F 16/9024 |

OTHER PUBLICATIONS

Neo4j, Inc. "Graph Database Visualization Graph Exploration & Collaboration", © 2021, 11 pages, retrieved on Dec. 3, 2021 from: <https://neo4j.com/product/bloom/>.
Neo4j, Inc. "Graph Visualization Tools—Developer Guides", © 2021, 7 pages, retrieved on Dec. 3, 2021 from: <https://neo4j.com/developer/tools-graph-visualization/>.

(Continued)

*Primary Examiner* — Hares Jami
(74) *Attorney, Agent, or Firm* — TUCKER ELLIS LLP

(57) ABSTRACT

In accordance with an embodiment, described herein is a system and method for providing a network-visualization browser extension in an analytics environment. An analytic applications environment can be provided by, or otherwise operate at, a computer system providing access to a data warehouse, or data warehouse instance. The system is adapted for generating a network graph from analytic artifacts, including display of one or more dataflows as dataflow constellation visualizations that illustrates the dataflows and a lineage or other relationship information. The systems and methods disclosed herein can provide tools to provide insights for users of an analytics environment with regard to the users' analytic artifacts and relationships among the same.

15 Claims, 15 Drawing Sheets

(56) References Cited

OTHER PUBLICATIONS

Oracle, Oracle Analytics Cloud, OAC Custom Viz Plugin-Network Graph Visualization—YouTube, 3 pages, retrieved on Dec. 7, 2020 from: <https://www.youtube.com/watch?v=NSGC7Gpmnzo>.
Oraclebitechdemo, "The New Network Graph Custom Viz Plugin for Oracle Analytics" Oracle Underground BI & Dataviz, OACS Partner Live Access, Dec. 7, 2020, 3 pages, retrieved from: <https://oracledataviz.blogspot.com/2020/12/using-network-graph-oac-custom-viz.html?sm_au_=iVVSkVT2qnN4rMsrGMqB8KtWJNkp1>.

* cited by examiner

SYSTEM AND METHOD FOR GENERATING A NETWORK GRAPH FROM ANALYTIC ARTIFACTS IN AN ANALYTICS ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to data analytics, and computer-based methods of providing business intelligence or other types of data, and are particularly related to a system and method for generating a network graph from analytic artifacts in an analytics environment.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments. However, different customers or users may have different requirements or preferences with regard to how their data is provided.

SUMMARY

In accordance with an embodiment, described herein is a system and method for providing a network-visualization browser extension in an analytics environment. An analytic applications environment can be provided by, or otherwise operate at, a computer system providing access to a data warehouse, or data warehouse instance. The system is adapted for generating a network graph from analytic artifacts, including display of one or more dataflows as dataflow constellation visualizations that illustrates the dataflows and a lineage or other relationship information. The systems and methods disclosed herein can provide tools to provide insights for users of an analytics environment with regard to the users' analytic artifacts and relationships among the same.

DETAILED DESCRIPTION

Figure 1:
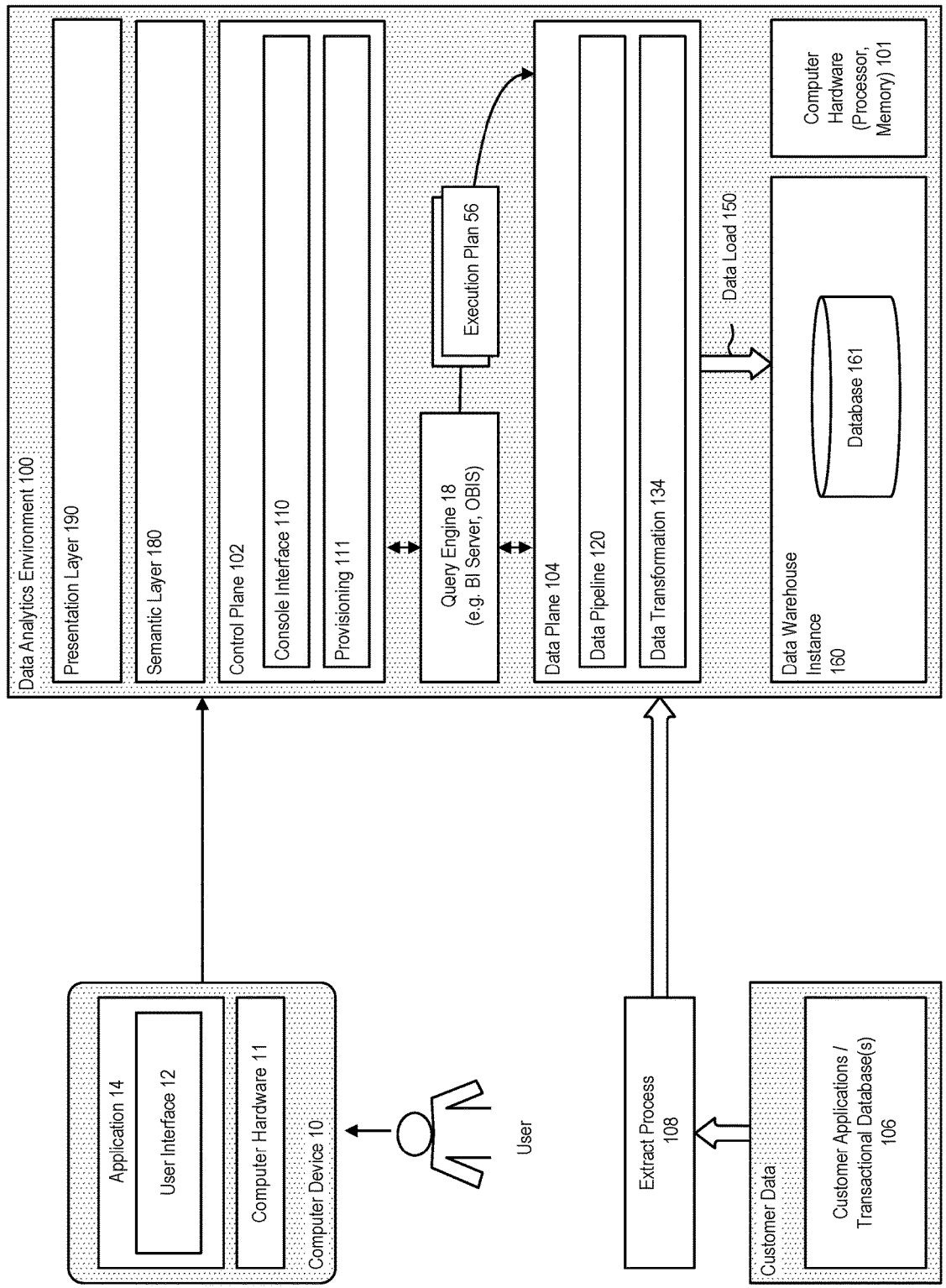
FIG. 1 illustrates an example data analytics environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In accordance with an embodiment, a data analytics or analytic applications environment enables data analytics within the context of an organization's enterprise software application or data environment, or a software-as-a-service or other type of cloud environment; and supports the development of computer-executable software analytic applications.

INTRODUCTION

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Data Analytics Environments

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

In accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan 56, that can include various child (leaf) nodes, generally referred to herein in various embodiments as RqLists, and produces one or more diagnostic log entries. Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
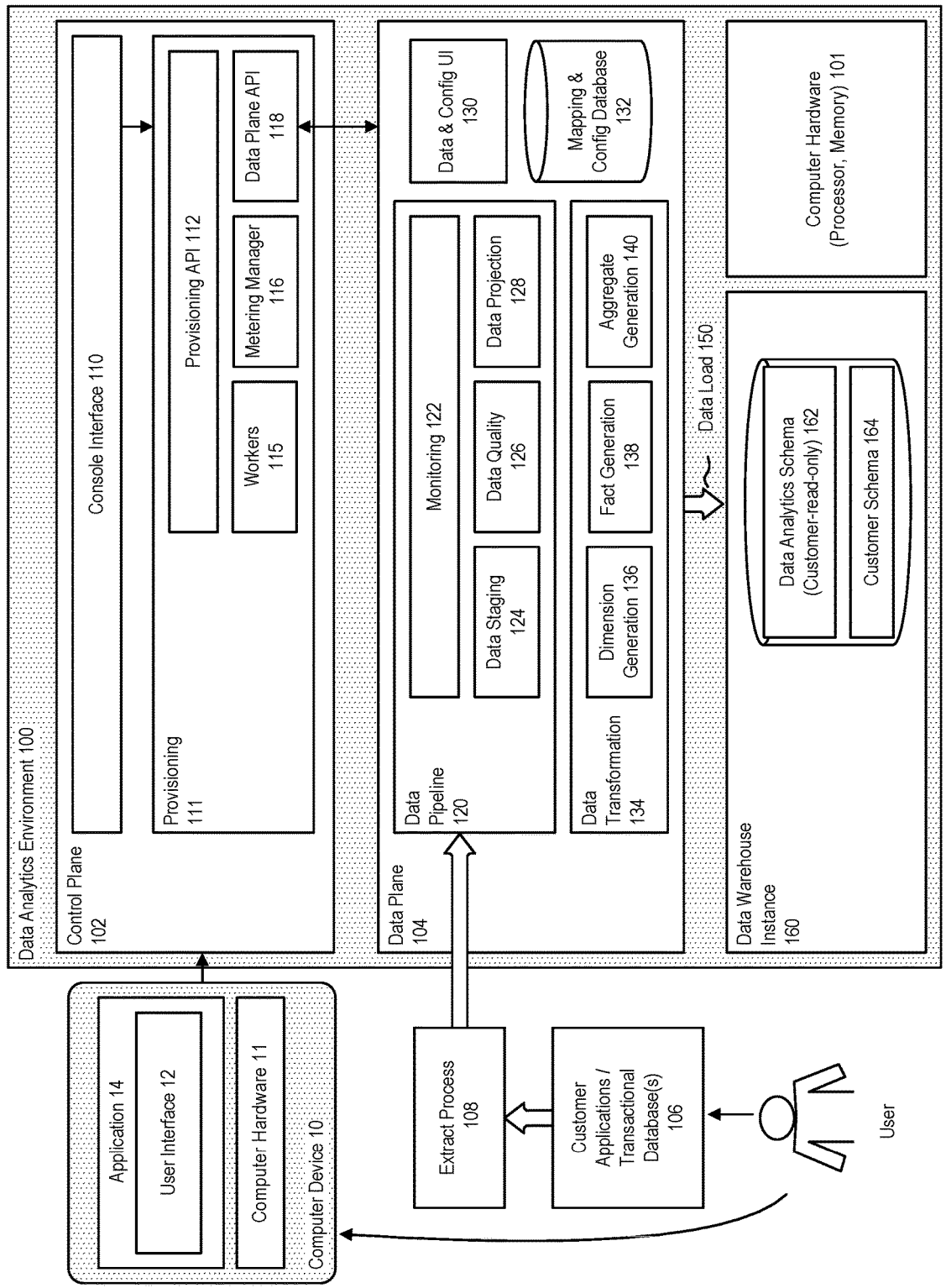
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different datasets (data sets) to be transformed. Based on the determined dependencies, the monitoring component can determine which of several different datasets should be transformed to the model format first.

For example, in accordance with an embodiment, if a first model dataset incudes no dependencies on any other model dataset; and a second model dataset includes dependencies to the first model dataset; then the monitoring component can determine to transform the first dataset before the second dataset, to accommodate the second dataset's dependencies on the first dataset.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
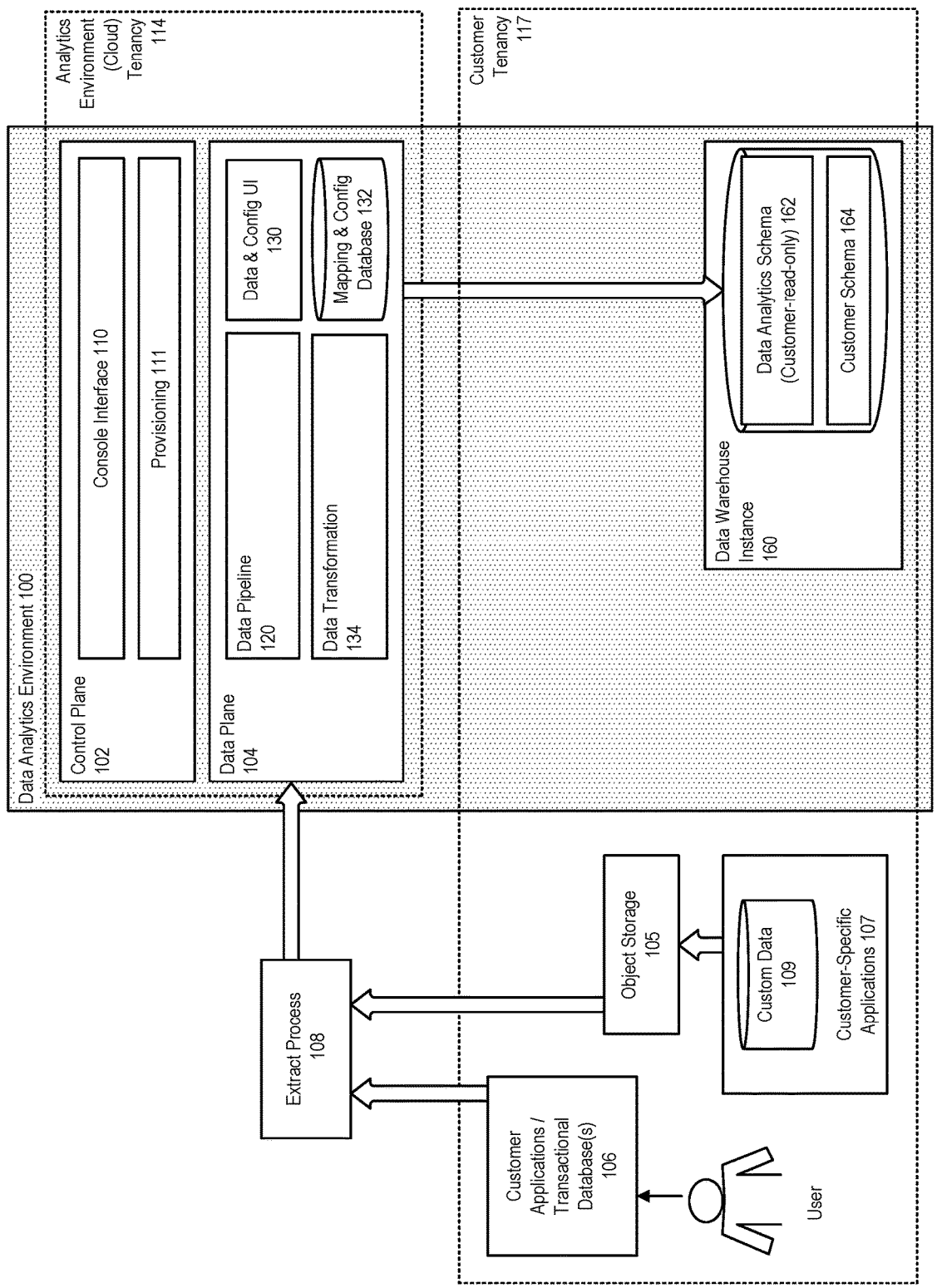
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a dataset that uses tables from different connections and schemas. The system uses the relationships defined between these tables to create relationships or joins in the dataset.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
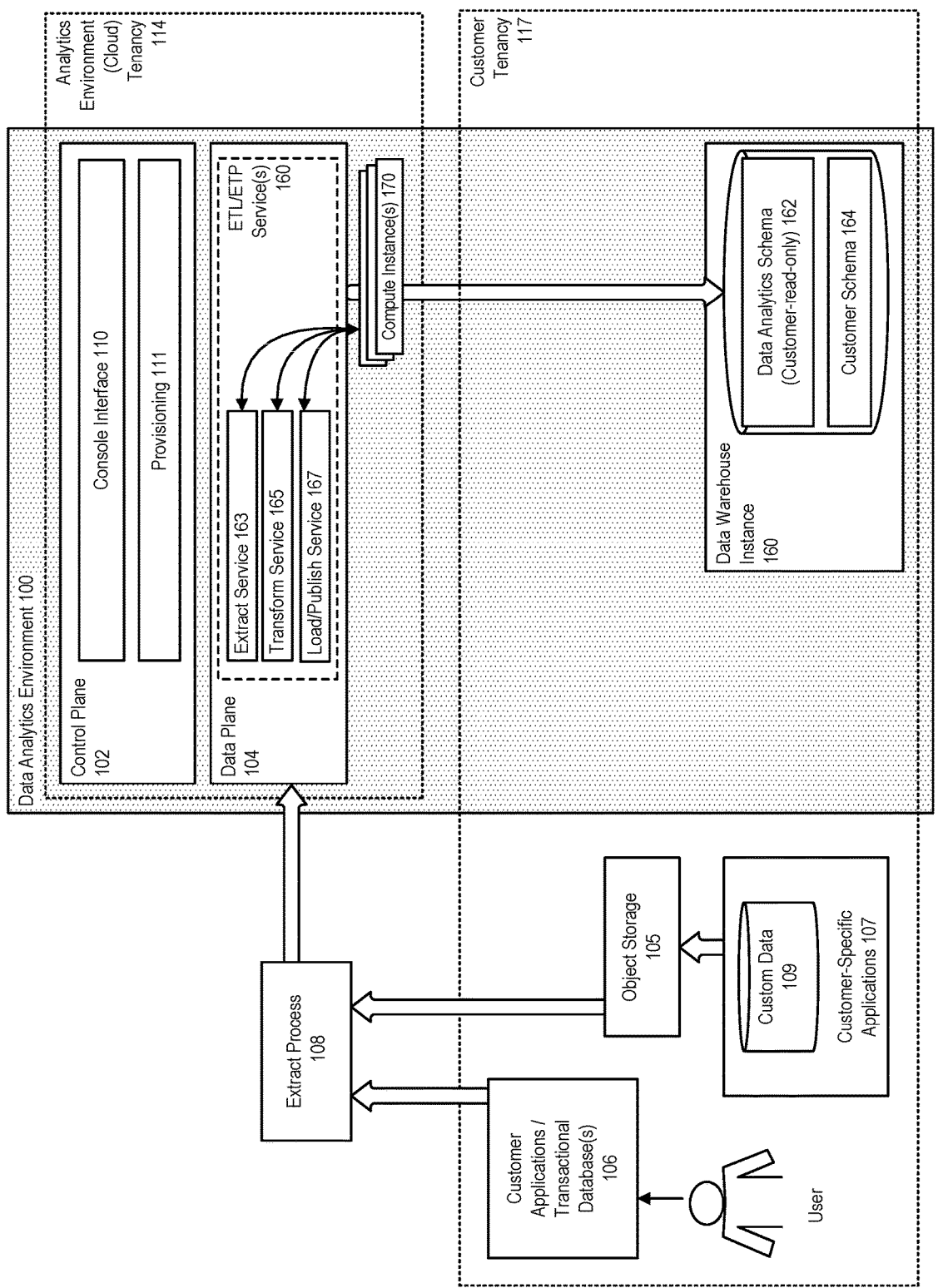
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a REST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
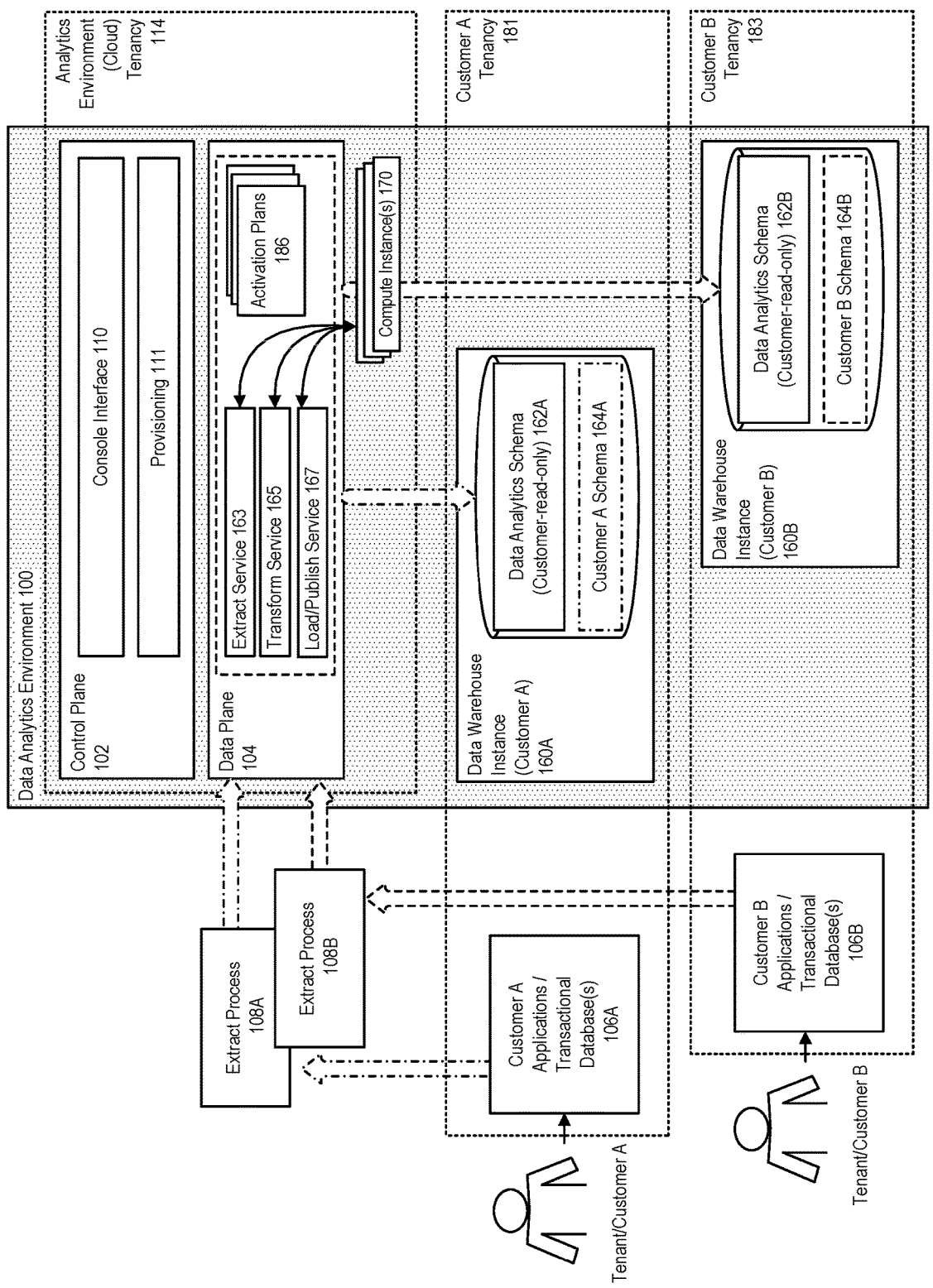
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Analytics Cloud Environments

In accordance with an embodiment, an analytic applications environment can be provided in association with an analytics cloud environment (analytics cloud), such as, for example, an Oracle Analytics Cloud (OAC) environment. Such an environment provides a scalable and secure public cloud service that provides capabilities to explore and perform collaborative analytics. Additional features provided by an analytics cloud environment can include, for example:

High-performance platform with flexible data storage.

Data preparation: Analysts can ingest, profile, and cleanse data using a variety of algorithms.

Dataflow: Analysts can prepare, transform and aggregate data, and then run machine-learning models at scale.

Data discovery: Subject matter experts can collaborate with business users, blending intelligent analysis at scale, machine learning, and statistical modeling.

Data visualization: Analysts can visualize any data, on any device, on premises and in the cloud.

Data collaboration: Organizations can share data, without the need to manage or consolidate multiple versions of spreadsheets, and quickly perform ad hoc analysis of the spreadsheet data.

Data-driven: Application developers can utilize interfaces that enable them to extend, customize, and embed rich analytic experiences in the application flow; for example, to take data from any source, and explore and collaborate with real-time data.

Extensibility and Customization

Different customers of a data analytics environment may have different requirements with regard to how their data is classified, aggregated, or transformed, for purposes of providing data analytics or business intelligence data, or developing software analytic applications.

In accordance with an embodiment, to support such different requirements, the system can include a semantic layer that enables the use of custom semantic extensions to extend a semantic data model (semantic model), and provide custom content at a presentation layer. Extension wizards or development environments can guide users in using the custom semantic extensions to extend or customize the semantic model, through a definition of branches and steps, followed by promotion of the extended or customized semantic model to a production environment.

Data Analytic Artifacts, Datasets, and Dataflows

Figure 6:
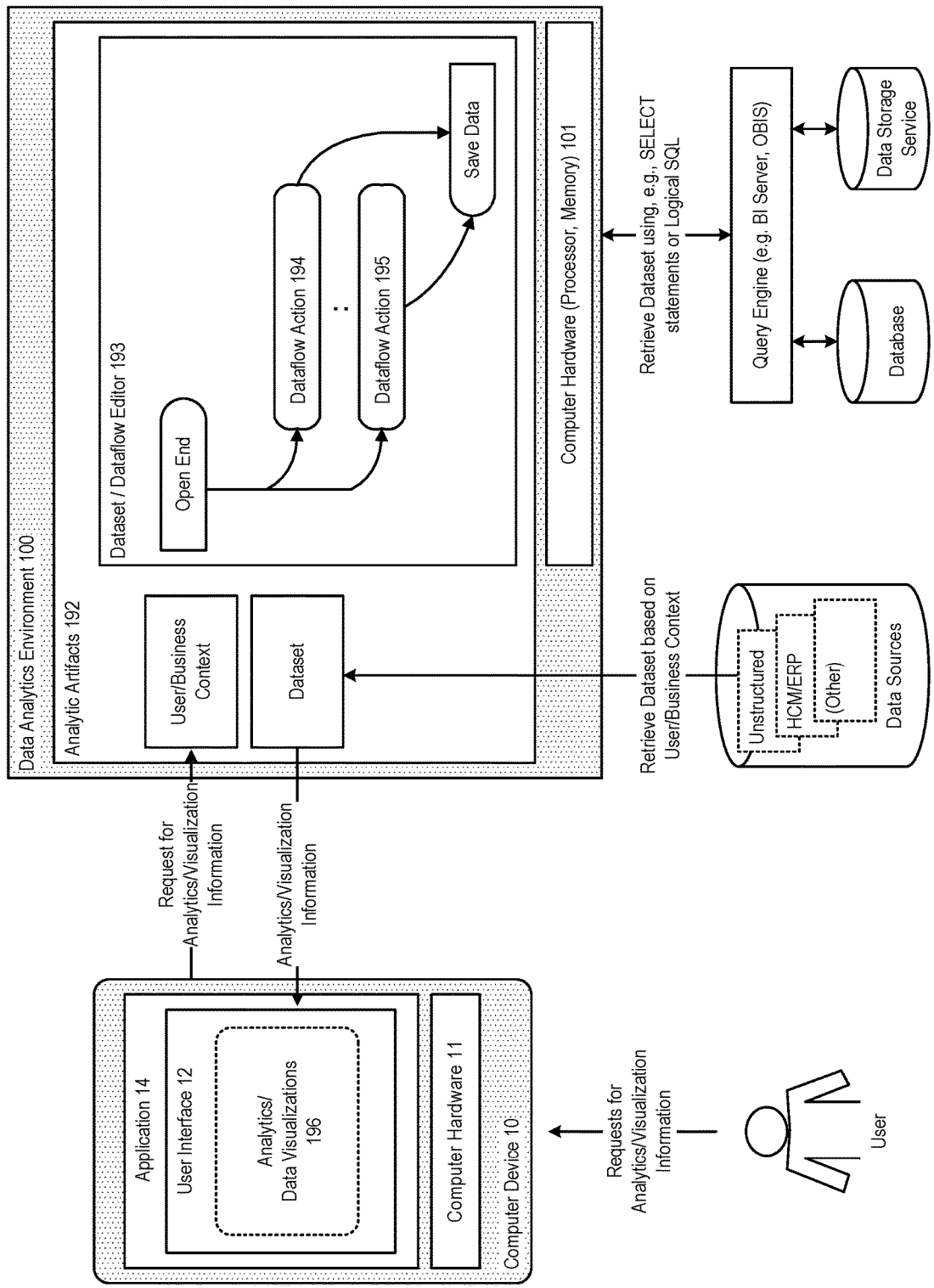
FIG. 6 illustrates a use of the system to transform, analyze, or visualize data, in accordance with an embodiment.

FIG. 6 illustrates a use of the system to transform, analyze, or visualize data, in accordance with an embodiment.

In accordance with an embodiment, the systems and methods disclosed herein can be used to provide insights for users of an analytics environment with regard to the users' analytic artifacts 192 and relationships among the same. A model can then be used to visualize relationships between such analytic artifacts via, e.g., a user interface, as a network chart or visualization of relationships and lineage between artifacts (e.g., User, Role, DV Project, Dataset, Connection, Dataflow, Sequence, ML Model, ML Script).

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the analytics system, or in the example of a cloud environment via a cloud service provided by the environment.

In accordance with an embodiment, the user interface can include or provide access to various dataflow action types, as described in further detail below, that enable self-service text analytics, including allowing a user to display a dataset, or interact with the user interface to transform, analyze, or visualize the data, for example to generate graphs, charts, or other types of data analytics or visualizations of dataflows.

In accordance with an embodiment, the analytics system enables a dataset to be retrieved, received, or prepared from one or more data source(s), for example via one or more data source connections. Examples of the types of data that can be transformed, analyzed, or visualized using the systems and methods described herein include HCM, HR, or ERP data, e-mail or text messages, or other of free-form or unstructured textual data provided at one or more of a database, data storage service, or other type of data repository or data source.

For example, in accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client. For example, the data analytics system can retrieve a dataset using, e.g., SELECT statements or Logical SQL instructions.

In accordance with an embodiment, the system can create a model or dataflow that reflects an understanding of the dataflow or set of input data, by applying various algorithmic processes, to generate visualizations or other types of useful information associated with the data. The model or dataflow can be further modified within a dataset/dataflow editor 193 by applying various processing or techniques to the dataflow or set of input data, including for example one or more dataflow actions 194, 195 or steps, that operate on the dataflow or set of input data. A user can interact with the system via a user interface, to control the use of dataflow actions to generate data analytics, data visualizations 196, or other types of useful information associated with the data.

In accordance with an embodiment, datasets are self-service data models that a user can build for data visualization and analysis requirements. A dataset contains data source connection information, tables, and columns, data enrichments and transformations. A user can use a dataset in multiple workbooks and in dataflows.

In accordance with an embodiment, when a user creates and builds a dataset, they can, for example: choose between many types of connections or spreadsheets; create datasets based on data from multiple tables in a database connection, an Oracle data source, or a local subject area; or create datasets based on data from tables in different connections and subject areas.

For example, in accordance with an embodiment, a user can build a dataset that includes tables from an Autonomous Data Warehouse connection, tables from a Spark connection, and tables from a local subject area; specify joins between tables; and transform and enrich the columns in the dataset.

In accordance with an embodiment, additional artifacts, features, and operations associated with datasets can include, for example:

View available connections: a dataset uses one or more connections to data sources to access and supply data for analysis and visualization. A user list of connections contains the connections that they built and the connections that they have permission to access and use.

Create a dataset from a connection: when a user creates a dataset, they can add tables from one or more data source connections, add joins, and enrich data.

Add multiple connections to a dataset: a dataset can include more than one connection. Adding more connections allows a user to access and join all of the tables and data that they need to build the dataset. The user can add more connections to datasets that support multiple tables.

Create dataset table joins: joins indicate relationships between a dataset's tables. If the user is creating a dataset based on facts and dimensions and if joins already exist in the source tables, then joins are automatically created in the dataset. If the user is creating a dataset from multiple connections and schemas, then they can manually define the joins between tables.

In accordance with an embodiment, a user can use dataflows to create datasets by combining, organizing, and integrating data. Dataflows enable the user to organize and integrate data to produce curated datasets that either they or other users can visualize.

For example, in accordance with an embodiment, a user might use a dataflow to: Create a dataset; Combine data from different source; aggregate data; and train a machine learning model or apply a predictive machine learning model to their data.

In accordance with an embodiment, a dataset/dataflow editor as described above allows a user to add actions or steps, wherein each step performs a specific function, for example, add data, join tables, merge columns, transform data, or save the data. Each step is validated when the user adds or changes it. When they have configured the dataflow, they can execute it to produce or update a dataset.

In accordance with an embodiment, a user can curate data from datasets, subject areas, or database connections. The user can execute dataflows individually or in a sequence. The user can include multiple data sources in a dataflow and specify how to join them. The user can save the output data from a dataflow in either a dataset or in a supported database type.

In accordance with an embodiment, additional artifacts, features, and operations associated with dataflows can include, for example:

Add columns: add custom columns to a target dataset.

Add data: add data sources to a dataflow. For example, if the user is merging two datasets, they add both datasets to the dataflow.

Aggregate: create group totals by applying aggregate functions; for example, count, sum, or average.

Branch: creates multiple outputs from a dataflow.

Filter: select only the data that the user is interested in.

Join: combine data from multiple data sources using a database join based on a common column.

Graph Analytics: perform geo-spatial analysis, such as calculating the distance or the number of hops between two vertices.

The above are provided by way of example; in accordance with an embodiment other types of steps can be added to a dataflow to transform a dataset or provide data analytics or visualizations.

Generating a Network Graph from Analytic Artifacts

One of the issues facing users of an analytics environment is the lack of tools that can be used to visualize relationships and lineage between various artifacts of the analytics environment.

In accordance with an embodiment, the systems and methods disclosed herein can provide tools to provide insights for users of an analytics environment with regard to the users' analytic (e.g., OAC) artifacts and relationships among the same. The systems and methods can gather and analyze metadata associated with the analytic artifacts in order to build a model representative of relationships between nodes via edges. Such a model can then be used to visualize relationships between such analytic artifacts via, e.g., a user interface, as a network chart or visualization of relationships and lineage between artifacts (e.g., User, Role, DV Project, Dataset, Connection, Dataflow, Sequence, ML Model, ML Script).

In accordance with an embodiment, the systems and methods provide a scalable solution that can incorporate other artifacts seamlessly (plug & play). In addition, the system provides a roadmap for use cases and UI gestures (e.g., one-click expansion of nodes and edges, insights into node and edge properties, etc.). The systems and methods can also provide a working end-to-end solution highlighting simple and other use cases.

In accordance with an embodiment, the systems and methods disclosed herein provide for an end visualization that can, for example, show a user or users where their data is being used, or where their data is being transported. By automatically determining relationships between nodes via edges, such visualizations can provide a powerful tool for users.

Figure 7:
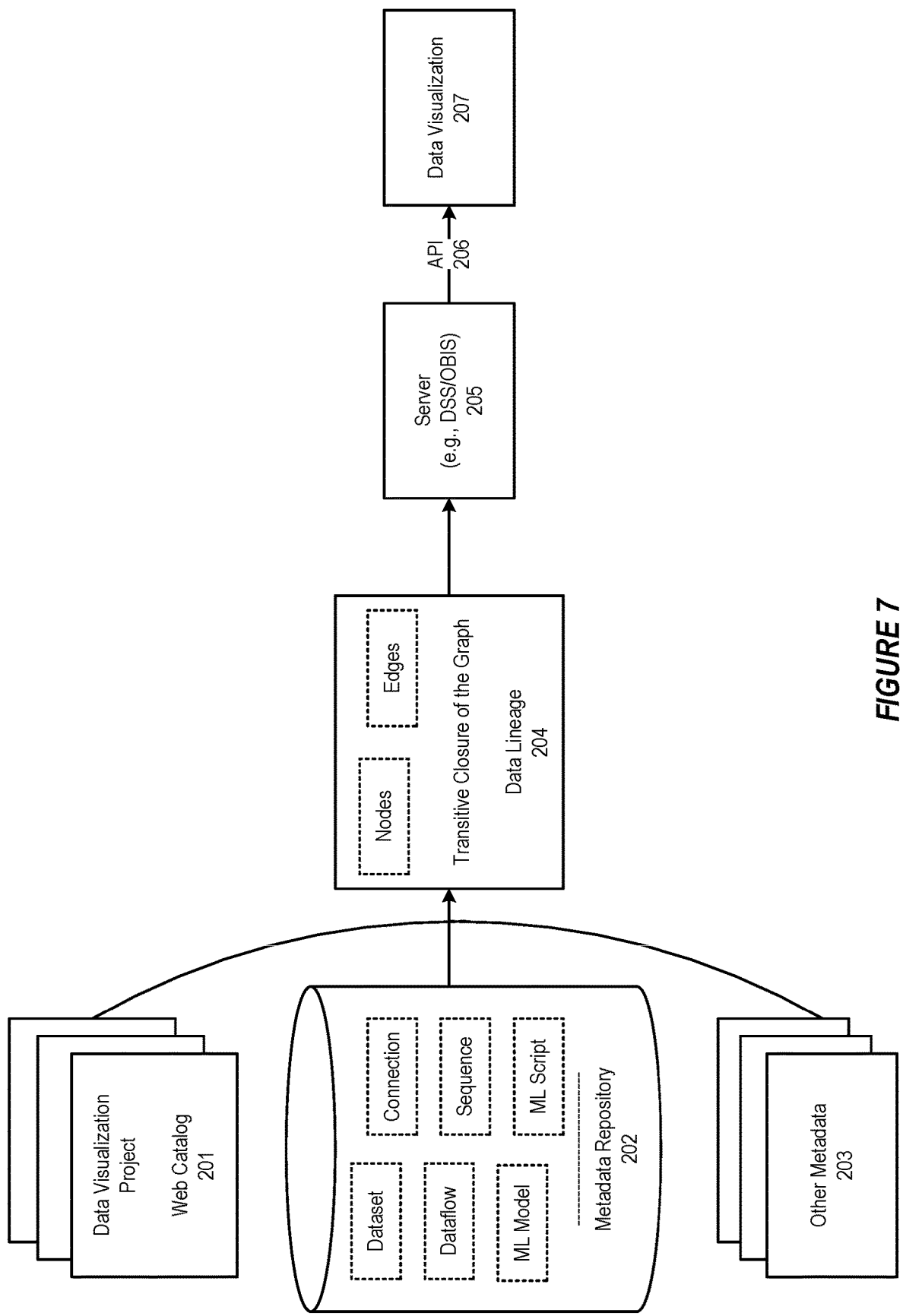
FIG. 7 illustrates a system architecture for network graph from analytic artifacts, in accordance with an embodiment.

FIG. 7 illustrates a system architecture for network graph from analytic artifacts, in accordance with an embodiment.

In accordance with an embodiment, the systems and methods can collect or marshal metadata into nodes and edges that is conducive for building a directed graph or standard format allowed to visualize in multiple tools (e.g., Oracle Data Visualization (DV), or Neo4j).

In accordance with an embodiment, a data lineage 204 (e.g., an OAC lineage) can be provided wherein nodes and edges are gathered, determined, and/or provided. The lineage can be connected to and pull data, such as metadata, from a number of sources, such as a web catalog 201, a metadata repository 202, or other metadata 203.

In accordance with an embodiment, a web catalog 201 can be a source of metadata for the data lineage. An example of a source for metadata for the data lineage from a web catalog can be an existing data visualization project. Such a data visualization project can comprise metadata that defines both nodes and edges between nodes, such as those defined by a modeler of such a data visualization project.

In accordance with an embodiment, a metadata repository 202 can also be a source of metadata for the data lineage 204. Such metadata repository can be, for example, an on-premise data store for a user, a cloud-based data store, an existing data store within an analytics environment, and other similar repositories. Metadata from such a metadata repository can comprise, for example, a dataset, a dataflow, a machine learning (ML) model, a connection, a sequence, or an ML script. Such a list is not presented merely as examples of sources of metadata and one of skill in the art would readily understand that such a metadata repository can comprise more or fewer sources of metadata for the data lineage.

In accordance with an embodiment, other metadata 203 can also be pulled by the data lineage. This could comprise, for example, metadata supplied directly by a user.

In accordance with an embodiment, the data lineage can plug into, e.g., via a connection or a plug-in, the sources of metadata 201, 202, 203. Then, the data lineage can, based upon a review of the metadata, build the metadata into a graph comprising nodes and edges.

In accordance with an embodiment, nodes can be provided (e.g., via a pre-existing data visualization) or calculated and determined. For example, each analytic artifact can be modeled as a node within the graph with well-defined properties. Nodes are assigned a name and a type, for example, as determined from the gathered metadata. Properties on the node are customizable based on the node type. For example: a node type 'Connection' can have 'external source' as one of the properties, whereas a node type 'Dataset' can have 'file length'. In addition to assigning metadata associated with artifacts as known node types, the data lineage can also determine and assign new node types, which can be automatically determined and added.

In accordance with an embodiment, the data lineage can also gather and determine edges. An edge can be defined as a relationship between two nodes within the graph. For example: 'connection' and 'dataset' can be connected using 'used by' relationship. In this example, the edge is directed from connection to dataset. Edges can have other properties; and new relationships can be seamlessly and automatically determined and added.

In accordance with an embodiment, nodes and edges can be determined and stored along with information about the nodes and edges. For example, a node can be stored along with an identifier of the node as well as the size of the node, such as, for example, an amount of space a dataset (e.g., a node) utilizes.

In accordance with an embodiment, once the nodes and edges have been gathered and marshalled at the data lineage, a transitive closure process can be used to generate one or more directed graphs. These directed graphs are computed to enumerate all possible paths between each of the gathered and marshalled nodes. Alternatively, the nodes and edges can be converted into property graph or Neo4j. Computing transitive closure is required if either of the above tools are not available.

In accordance with an embodiment, a metadata converter can be provided at the data lineage or between the data lineage and the sources metadata (e.g., federated sources). The metadata converted can utilize a group of adapters than can retrieve metadata from sources and transform into generic format that assists with building a directed graph (DG).

In accordance with an embodiment, a REST client can be utilized to invoke, e.g., DV REST APIs, to fetch project metadata and parse the data sources (e.g., RPD Subject Area, Dataset). Alternatively, the framework allows for data visualization to push the metadata as and when artifacts are created/updated/deleted.

In accordance with an embodiment, once the directed graph is generated, a server 205 can be utilized, e.g., via an API 206, to produce a data visualization 207 of the directed graph showing the determined relationships (i.e., edges) between the nodes defined by the metadata.

In accordance with an embodiment, the systems and methods described herein can support a layer of authentication in order to enforce access rights. That is, for a given user who utilizes the display, the user's access rights or authentication level can be used by the systems and methods to restrict the user's access to portions of the display and/or the underlying analytic artifacts.

FIGS. 8-13 illustrate examples of network graphs generated from analytic artifacts, in accordance with an embodiment.

Figure 8:
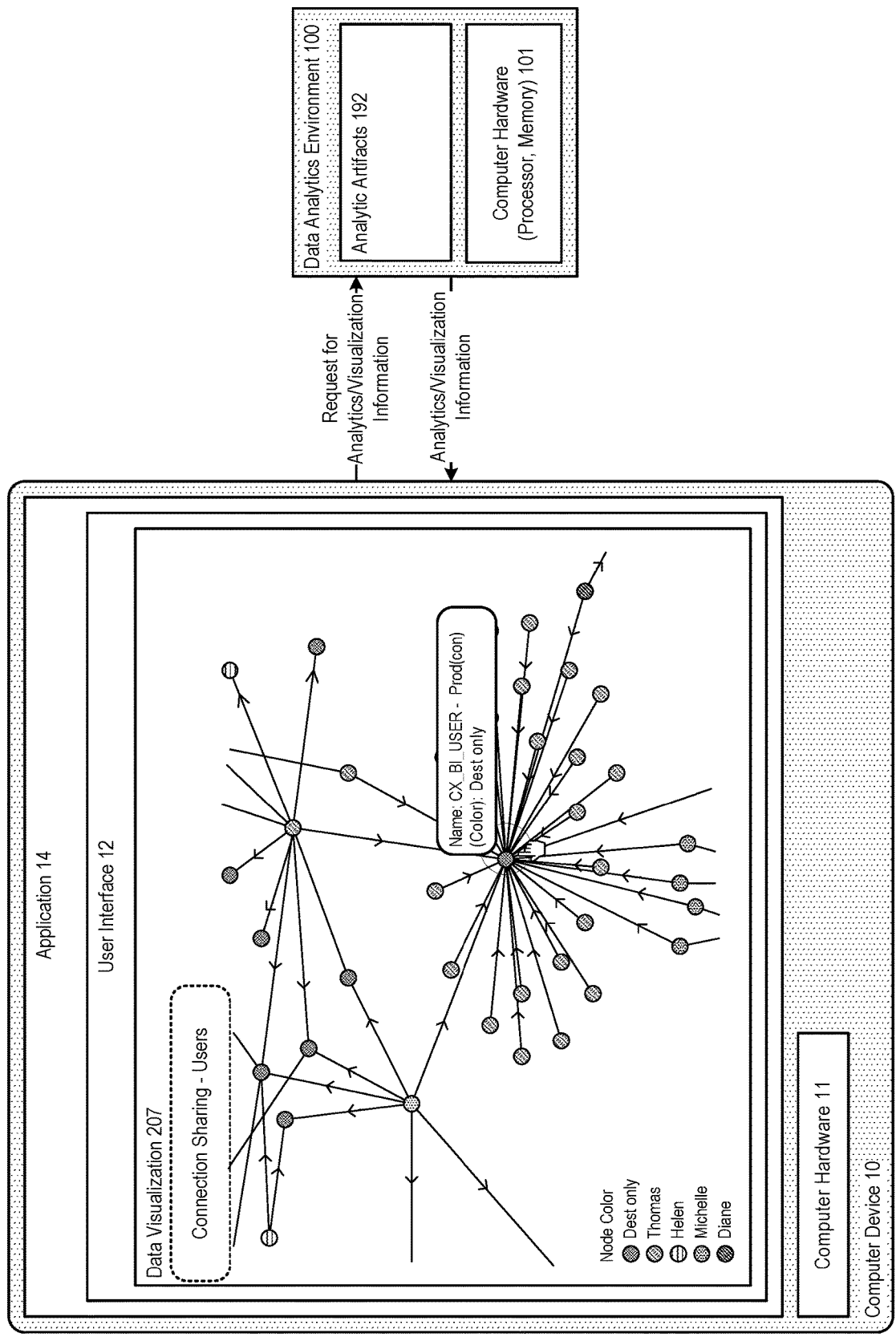
FIG. 8 illustrates an example of a network graph generated from analytic artifacts, in accordance with an embodiment.

In accordance with an embodiment, FIG. 8 illustrates a data visualization 207 of connection sharing among users as a determined directed graph as outlined above. As shown in the visualization, nodes are represented by variously-colored or patterned circles, while edges are defined by the variously-colored or patterned connections between nodes. Note that the edges can be directional. Such directionality can be representative of a determined relationship between the two connected nodes.

In accordance with an embodiment, a key can be provided in conjunction with the data visualization which defines categories of nodes (e.g., user, dataset, datasource) as well as different relationships types (e.g., "used by", "provided with"). Such information can be conveyed, e.g., via color coding with a data visualization.

Figure 9:
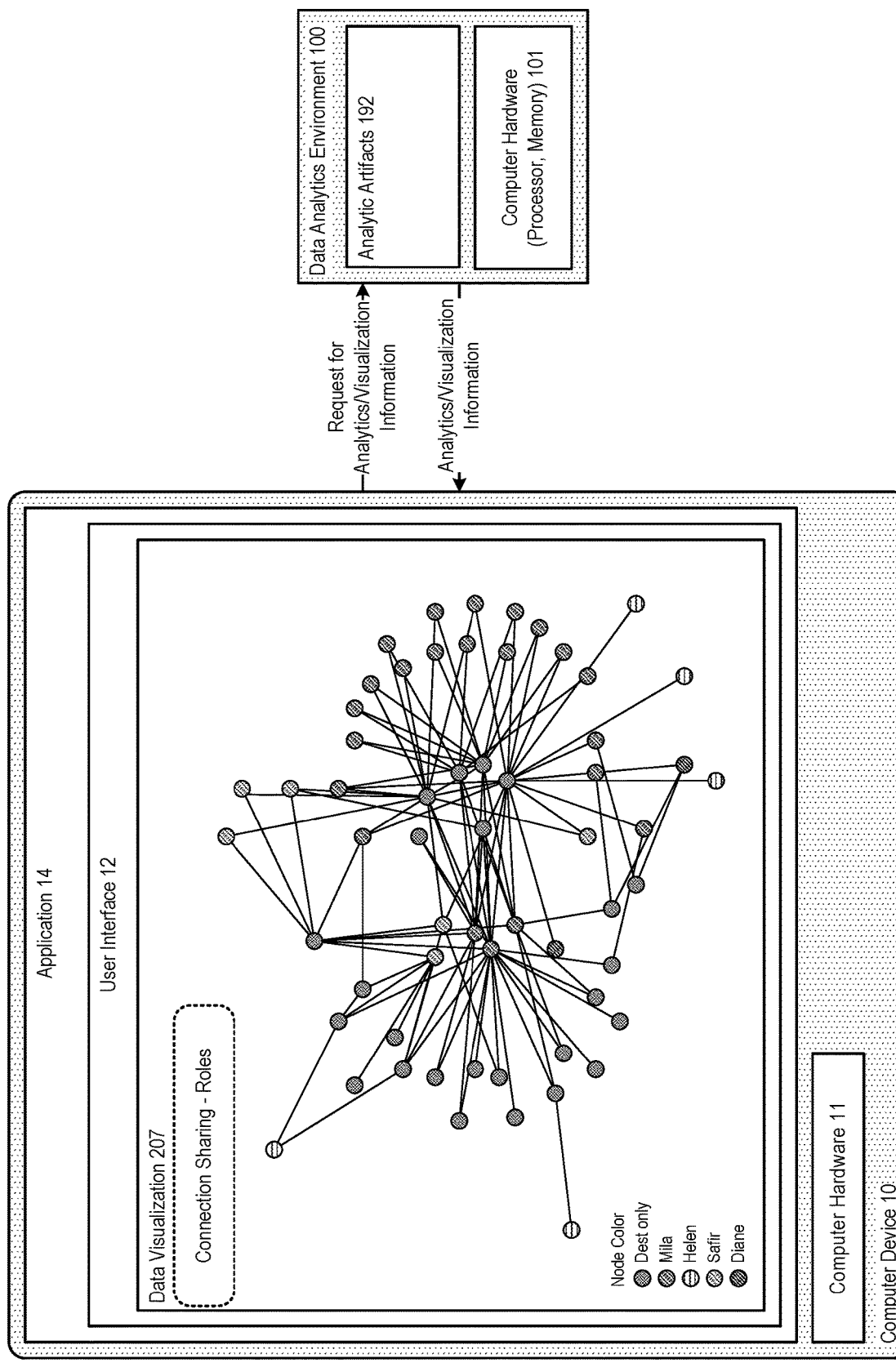
FIG. 9 illustrates another example of a network graph generated from analytic artifacts, in accordance with an embodiment.

In accordance with an embodiment, FIG. 9 illustrates a data visualization 207 of connection sharing among roles as a determined directed graph as outlined above. As shown in the visualization, nodes are represented by variously-colored or patterned circles, while edges are defined by the variously-colored or patterned connections between nodes. Note that the edges can be directional. Such directionality can be representative of a determined relationship between the two connected nodes.

In accordance with an embodiment, a key can be provided in conjunction with the data visualization which defines categories of nodes (e.g., user, dataset, datasource) as well as different relationships types (e.g., "used by", "provided with"). Such information can be conveyed, e.g., via color coding with a data visualization.

Figure 10:
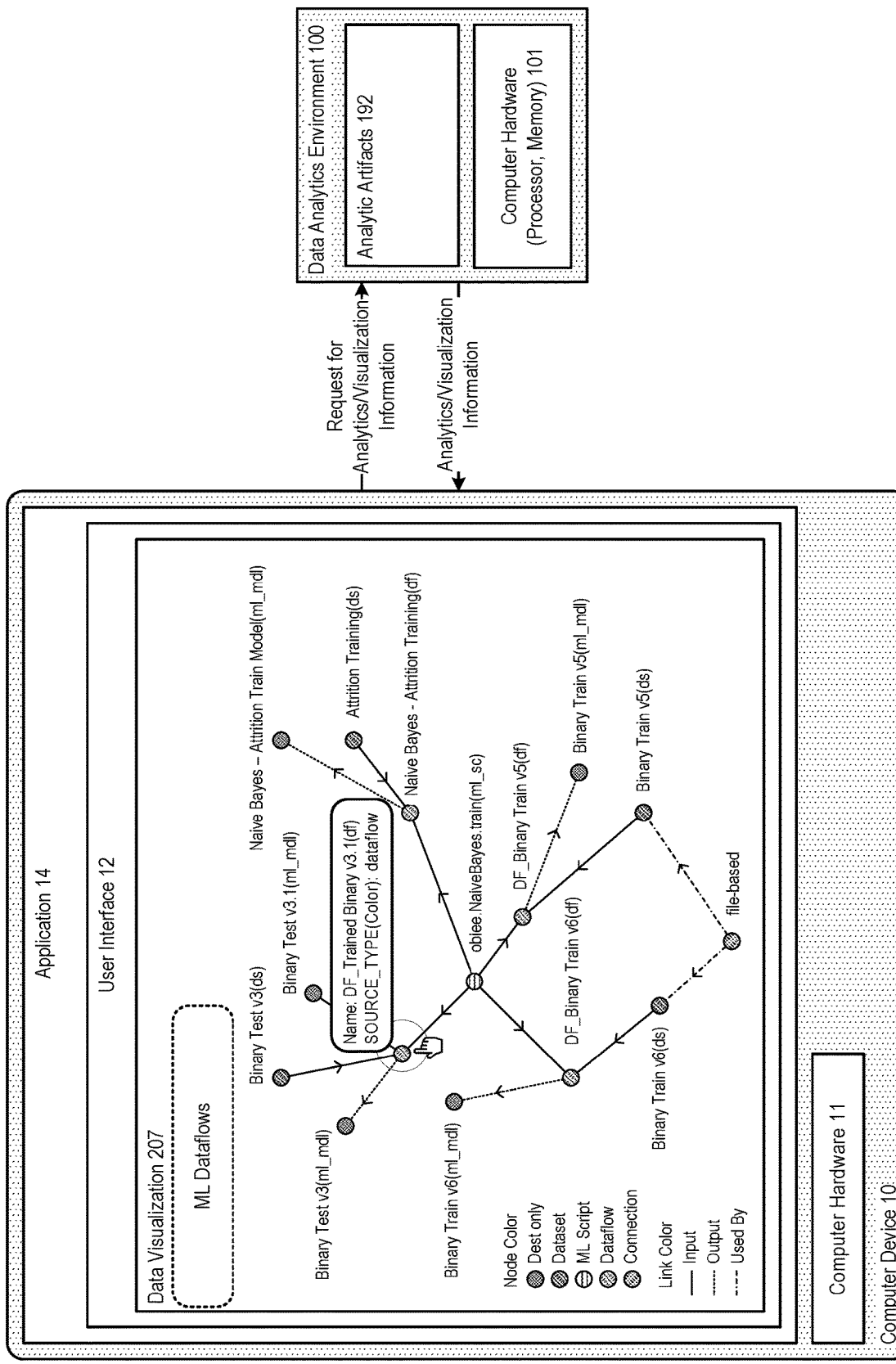
FIG. 10 illustrates another example of a network graph generated from analytic artifacts, in accordance with an embodiment.

In accordance with an embodiment, FIG. 10 illustrates a data visualization 207 of connection sharing among machine learning dataflows as a determined directed graph as outlined above. As shown in the visualization, nodes are represented by variously-colored or patterned circles, while edges are defined by the variously-colored or patterned connections between nodes. Note that the edges can be directional. Such directionality can be representative of a determined relationship between the two connected nodes.

In accordance with an embodiment, a key can be provided in conjunction with the data visualization which defines categories of nodes (e.g., user, dataset, datasource) as well as different relationships types (e.g., "used by", "provided with"). Such information can be conveyed, e.g., via color coding with a data visualization.

In accordance with an embodiment, as shown in the Figure, various portions of the data visualization can be selectable and can comprise information about the nodes or edges. For example, as depicted, when the node is selected, information about the node can be displayed.

Figure 11:
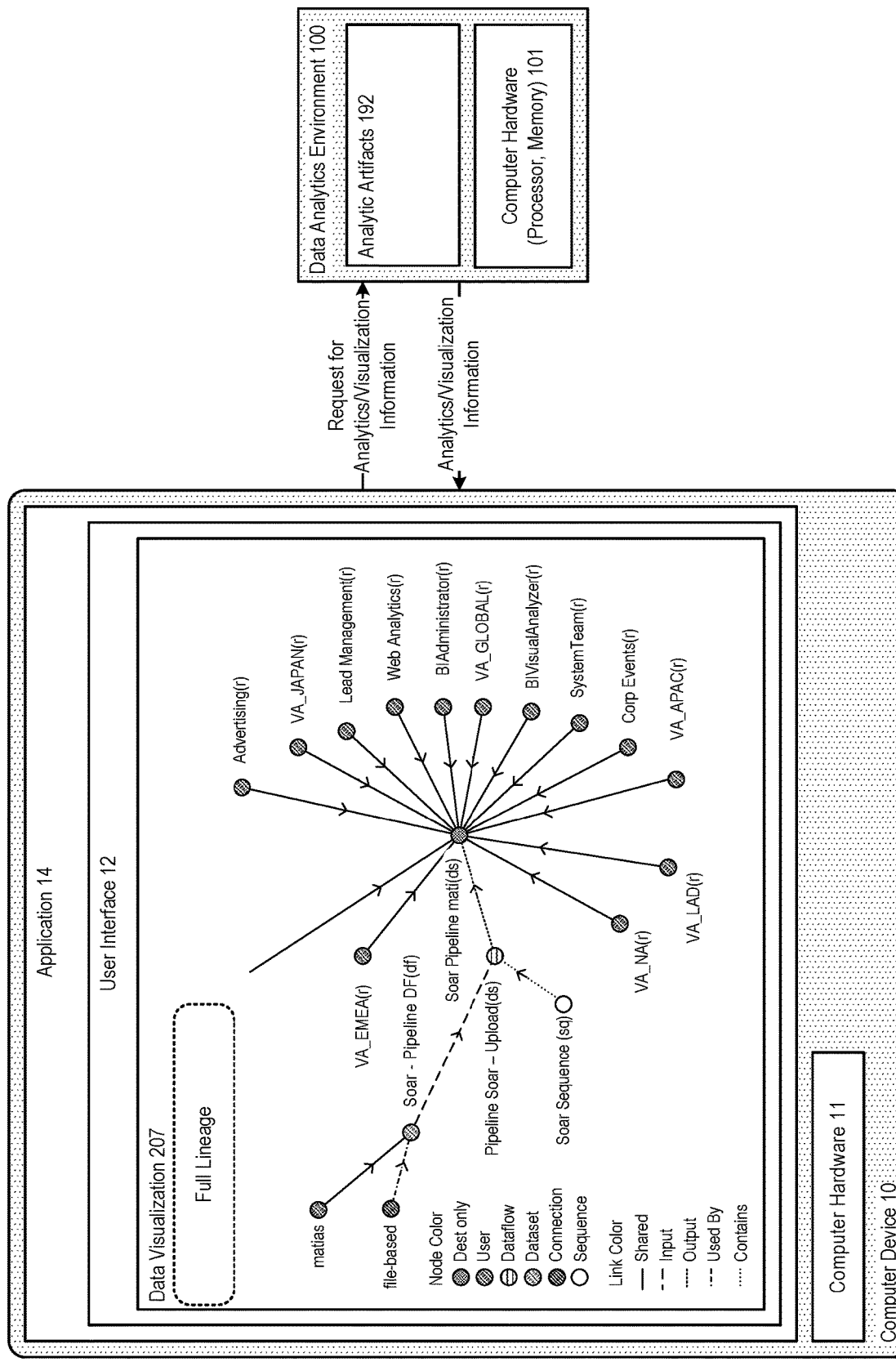
FIG. 11 illustrates another example of a network graph generated from analytic artifacts, in accordance with an embodiment.
Figure 12:
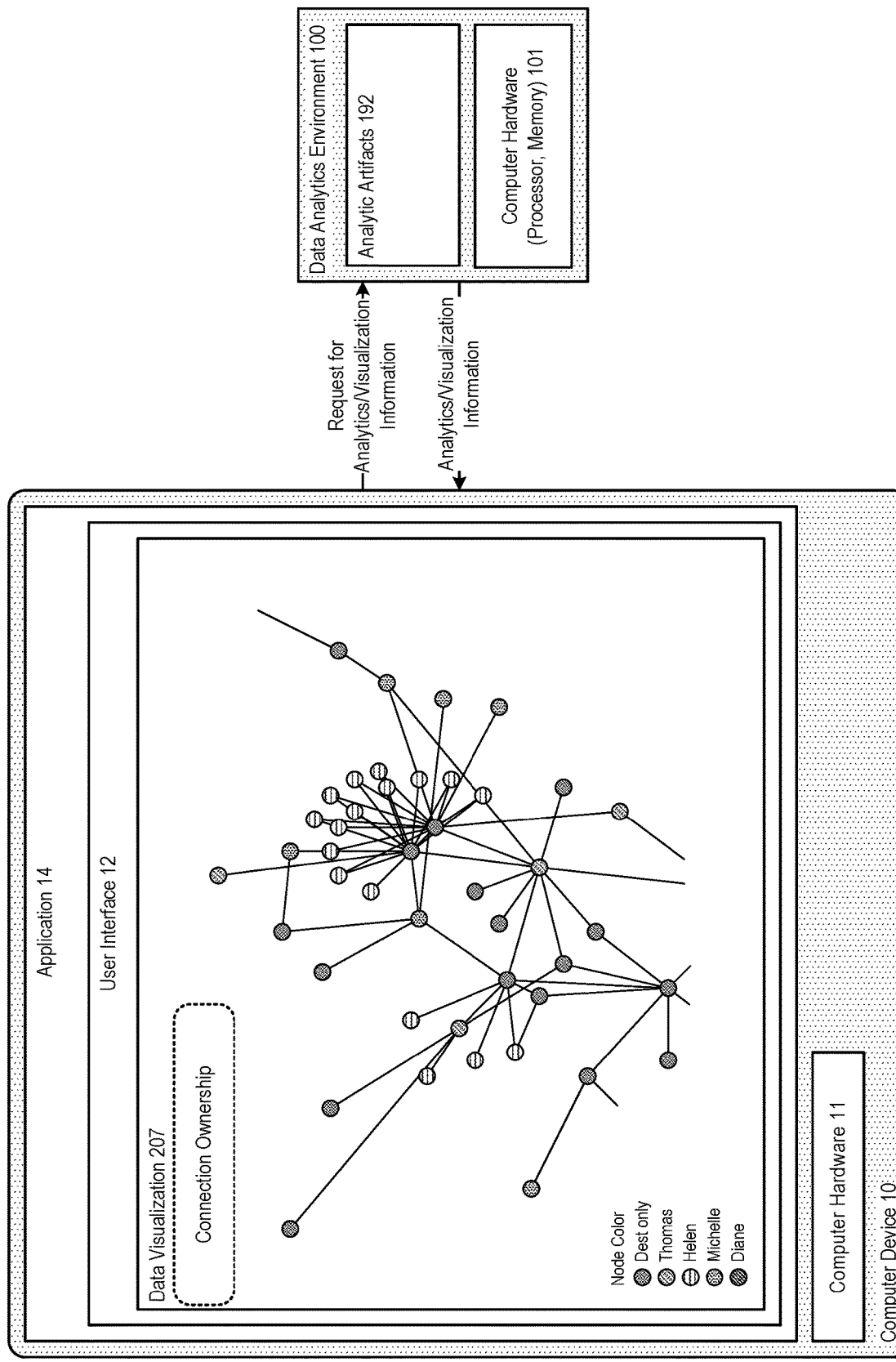
FIG. 12 illustrates another example of a network graph generated from analytic artifacts, in accordance with an embodiment.
Figure 13:
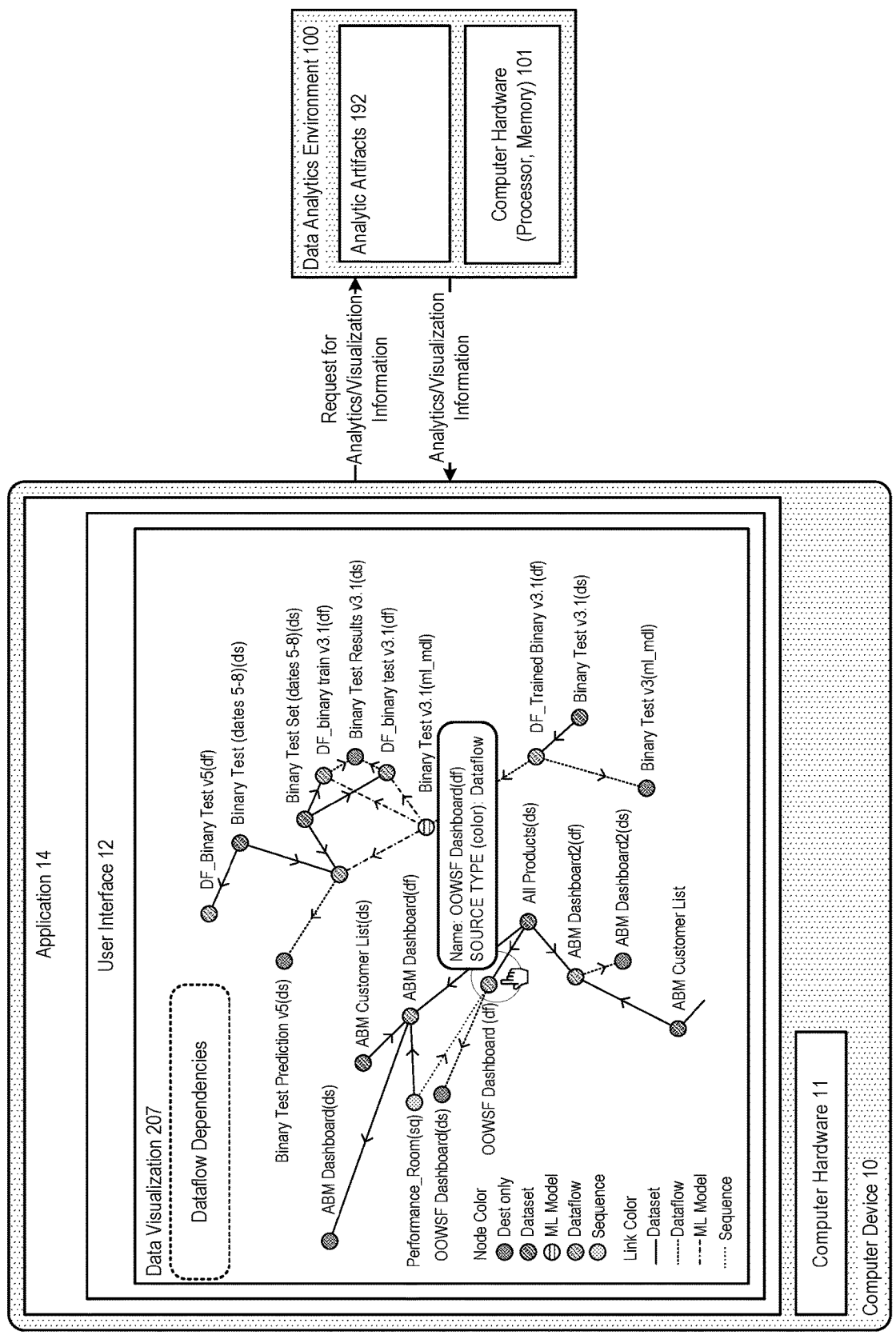
FIG. 13 illustrates another example of a network graph generated from analytic artifacts, in accordance with an embodiment.

FIGS. 11-13 further illustrate various examples of data visualizations that can be generated to illustrate network graphs generated from analytic artifacts, in accordance with an embodiment.

Figure 14:
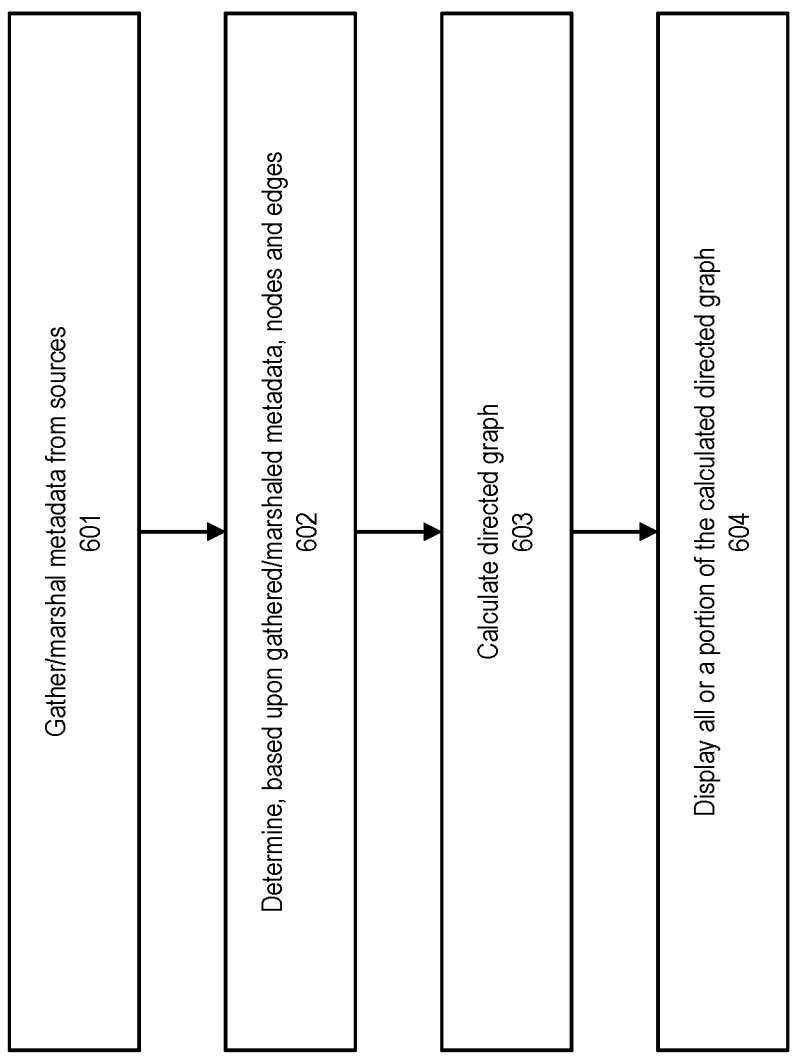
FIG. 14 is a flowchart of a method for generating a network graph from analytic artifacts, in accordance with an embodiment.

FIG. 14 is a flowchart of a method for generating a network graph from analytic artifacts, in accordance with an embodiment.

In accordance with an embodiment, at step 601, the method can gather and/or marshal metadata of analytic artifacts from one or more sources. As described above, such sources can comprise pre-existing data visualization projects, metadata repositories, or other sources of metadata. Such sources can be, for example, federated, on-premise, cloud based, user-supplied, etc.

In accordance with an embodiment, the gathering and/or marshalling of such metadata can be performed via connections with the sources of metadata, or, for example, can be via a plugin.

In accordance with an embodiment, at 602, once the metadata has been gathered and/or marshalled, the method can determine a plurality of nodes and a plurality of edges. As describe above, nodes can be provided (e.g., via a pre-existing data visualization) or calculated and determined. For example, each analytic artifact can be modeled as a node within the graph with well-defined properties. Nodes are assigned a name and a type, for example, as determined from the gathered metadata. Properties on the node are customizable based on the node type. For example: a node type 'Connection' can have 'external source' as one of the properties, whereas a node type 'Dataset' can have 'file length'. In addition to assigning metadata associated with artifacts as known node types, the data lineage can also determine and assign new node types, which can be automatically determined and added.

In accordance with an embodiment, likewise, an edge can be defined as a relationship between two nodes within the graph. For example: 'connection' and 'dataset' can be connected using 'used by' relationship. In this example, the edge is directed from connection to dataset. Edges can have other properties; and new relationships can be seamlessly and automatically determined and added.

In accordance with an embodiment, at step 603, the method can, based upon each of the nodes and edges, calculate a directed graph that comprises nodes as well as relationships (i.e., edges) between each of the nodes.

In accordance with an embodiment, at step 604, via, for example, an analytics environment and a display thereof, all or a portion of the calculated directed graph can be displayed. This display can comprise an interactive display that allows a user to interact with, for example, by a zoom in/out, focus, lock, unlock, etc., of various portions of the displayed directed graph.

In accordance with an embodiment, the systems and methods, when given a dataflow, can visualize its lineage; for example input and output datasets, or sequences it belongs to; or can expand output dataset lineage to visualize the users with whom it is shared.

In accordance with an embodiment, the systems and methods, when given a ML script, can visualize its lineage; for example dataflows used as input; or expand dataflows lineage to visualize the output ML model and input dataset.

In accordance with an embodiment, the systems and methods can support DV projects; for example to visualize projects, it's datasets and subsequent lineage.

In accordance with an embodiment, the systems and methods can support display of a dataflow constellation; for example, a visualization that shows all the dataflows and their relationships.

In accordance with an embodiment, the systems and methods, given a connection, can visualize nearest neighbors (users) based on sharing; for example to expand a user and show its relationships In accordance with an embodiment, the systems and methods can utilized nearest neighbor; for example, given two users visualize all artifacts to which they have shared access.

In accordance with an embodiment, the systems and methods can utilize connection sharing pattern segmented by users and roles.

In accordance with an embodiment, the systems and methods can utilize quota usage by user, breakdown of analytic artifacts by count, breakdown of users/roles, artifacts ownership by user.

In accordance with an embodiment, the systems and methods can use datasets by external source, datasets by file size, connections by external source.

Figure 15:
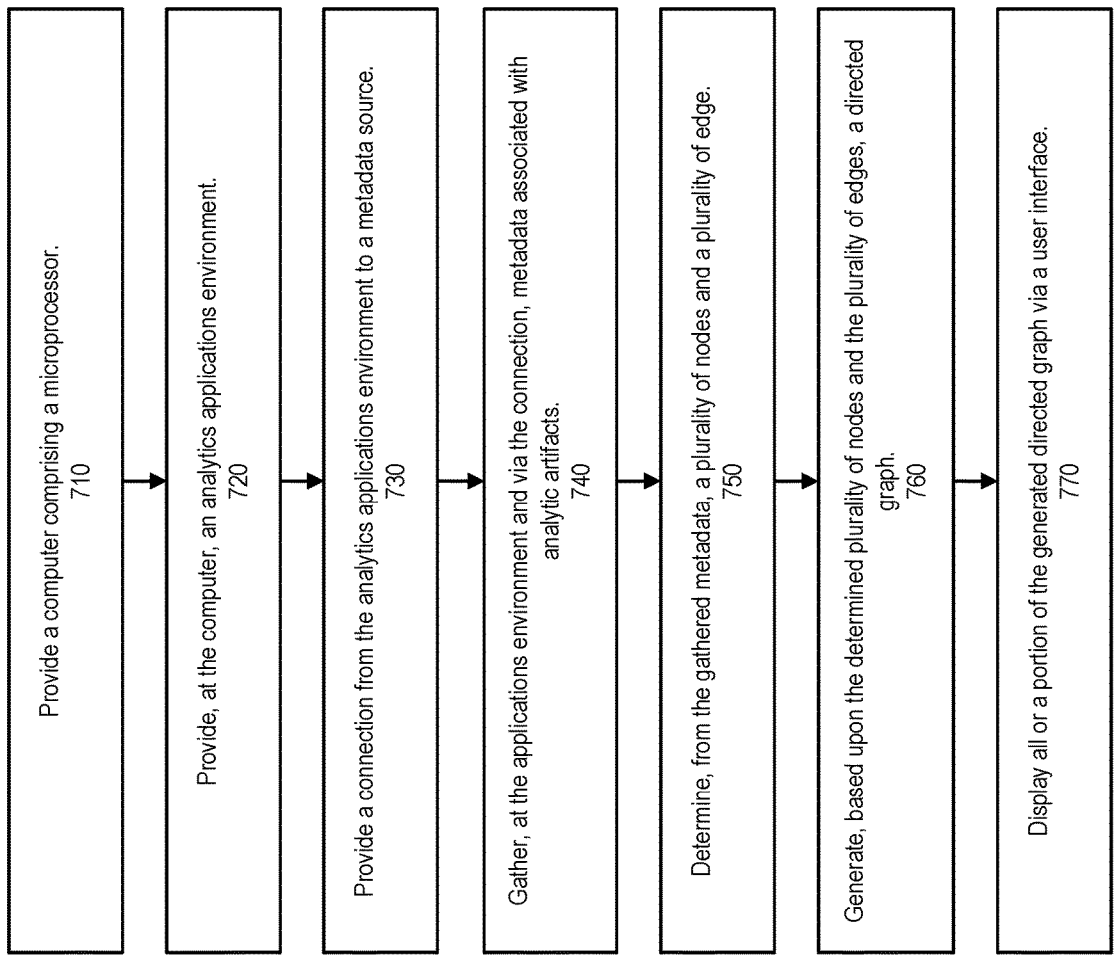
FIG. 15 is a flowchart of a method for generating a network graph from analytic artifacts, in accordance with an embodiment.

FIG. 15 is a flowchart of a method for generating a network graph from analytic artifacts, in accordance with an embodiment.

In accordance with an embodiment, at step 710, the method can provide a computer comprising a microprocessor.

In accordance with an embodiment, at step 720, the method can provide, at the computer, an analytics applications environment.

In accordance with an embodiment, at step 730, the method can provide a connection from the analytics applications environment to a metadata source.

In accordance with an embodiment, at step 740, the method can gather, at the applications environment and via the connection, metadata associated with analytic artifacts.

In accordance with an embodiment, at step 750, the method can determine, from the gathered metadata, a plurality of nodes and a plurality of edges.

In accordance with an embodiment, at step 760, the method can generate, based upon the determined plurality of nodes and the plurality of edges, a directed graph.

In accordance with an embodiment, at step 770, the method can display all or a portion of the generated directed graph via a user interface.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for generating a network graph from analytic artifacts in an analytics environment, comprising:
   a computer comprising a microprocessor; and
   an analytics applications environment at the computer;
   wherein the microprocessor is configured to perform steps comprising:
   providing a connection from the analytics applications environment to a plurality of metadata sources;
   gathering, at the analytics applications environment and via the connection to the plurality of metadata sources, and from the plurality of metadata sources, metadata associated with analytic artifacts;
   converting the gathered metadata associated with analytic artifacts to a format usable within a directed graph;
   determining, from the gathered metadata, a plurality of nodes and a plurality of edges, each of the plurality of edges defining a relationship between at least two of the plurality of nodes, said determining including determining a type of relationship for each of the determined plurality of edges;
   assigning each of the plurality of determined nodes a name and a node type based upon the gathered metadata, wherein a first set of the plurality of determined nodes are assigned a type based upon an automatic determination by the analytics application environment, wherein each of the plurality of nodes are respectively associated with a set of properties, wherein each set of properties are customizable based upon the assigned node type;
   generating, based upon the determined plurality of nodes and the plurality of edges, a directed graph, the directed graph comprising the determined plurality of nodes and the determined plurality of edges;
   displaying, as an interactive display, all or a portion of the generated directed graph via a user interface, said displaying further comprising an indication of each of the determined type of relationship for each of the determined plurality of edges, said display further comprising, as selectable options, an indication of each of the assigned node types assigned to each node and the respective set of properties for each node, wherein said indication of each assigned node type is displayed upon an indication of a selection of a node;
   wherein access to the displayed portion of the generated directed graph, including the determined plurality of nodes and the determined plurality of edges, is restricted via an authentication level of a user accessing the displayed portion of the generated directed graph; and
   wherein, based upon the connection, two of the plurality of determined nodes are determined as nearest neighbors, and, based upon said determination of the two of the plurality of nodes, a visualization comprising all artifacts to which the two nearest neighbor nodes have shared access to is displayed.

2. The system of claim 1, the steps further comprising:
   receiving an indication of a user instruction via the user interface; and
   modifying the display of the generated directed graph at the user interface.

3. The system of claim 1, wherein the metadata source comprises a data visualization.

4. The system of claim 1, wherein the metadata source comprises a metadata repository.

5. The system of claim 1,
   wherein at least a set of the determined plurality of edges indicates a directionality between two of the plurality of determined nodes; and
   wherein such directionality is displayed via the user interface.

6. The system of claim 1,
   wherein the display of the all or a portion of the generated graph is displayed via a web-browser interface.

7. A method for generating a network graph from analytic artifacts in an analytics environment, comprising:
   providing a computer comprising a microprocessor;
   providing, at the computer, an analytics applications environment;
   providing a connection from the analytics applications environment to a plurality of metadata sources;
   gathering, at the analytics applications environment and via the connection to the plurality of metadata sources, and from the plurality of metadata sources, metadata associated with analytic artifacts;
   converting the gathered metadata associated with analytic artifacts to a format usable within a directed graph;
   determining, from the gathered metadata, a plurality of nodes and a plurality of edges, each of the plurality of edges defining a relationship between at least two of the plurality of nodes, said determining including determining a type of relationship for each of the determined plurality of edges;

assigning each of the plurality of determined nodes a name and a node type based upon the gathered metadata, wherein a first set of the plurality of determined nodes are assigned a type based upon an automatic determination by the analytics application environment, wherein each of the plurality of nodes are respectively associated with a set of properties, wherein each set of properties are customizable based upon the assigned node type;

generating, based upon the determined plurality of nodes and the plurality of edges, a directed graph, the directed graph comprising the determined plurality of nodes and the determined plurality of edges;

displaying, as an interactive display, all or a portion of the generated directed graph via a user interface, said displaying further comprising an indication of each of the determined type of relationship for each of the determined plurality of edges, said display further comprising, as selectable options, an indication of each of the assigned node types assigned to each node and the respective set of properties for each node, wherein said indication of each assigned node type is displayed upon an indication of a selection of a node;

wherein access to the displayed portion of the generated directed graph, including the determined plurality of nodes and the determined plurality of edges, is restricted via an authentication level of a user accessing the displayed portion of the generated directed graph; and wherein, based upon the connection, two of the plurality of determined nodes are determined as nearest neighbors, and, based upon said determination of the two of the plurality of nodes, a visualization comprising all artifacts to which the two nearest neighbor nodes have shared access to is displayed.

8. The method of claim 7, further comprising:
receiving an indication of a user instruction via the user interface; and
modifying the display of the generated directed graph at the user interface.

9. The method of claim 7, wherein the metadata source comprises a data visualization.

10. The method of claim 7, wherein the metadata source comprises a metadata repository.

11. The method of claim 7,
wherein at least a set of the determined plurality of edges indicates a directionality between two of the plurality of determined nodes; and
wherein such directionality is displayed via the user interface.

12. A non-transitory computer readable storage medium having instructions thereon for generating a network graph from analytic artifacts in an analytics environment, which when read and executed cause a computer to perform steps comprising:
providing a computer comprising a microprocessor;
providing, at the computer, an analytics applications environment;
providing a connection from the analytics applications environment to a plurality of metadata sources;
gathering, at the analytics applications environment and via the connection to the plurality of metadata sources, and from the plurality of metadata sources, metadata associated with analytic artifacts;
converting the gathered metadata associated with analytic artifacts to a format usable within a directed graph;
determining, from the gathered metadata, a plurality of nodes and a plurality of edges, each of the plurality of edges defining a relationship between at least two of the plurality of nodes, said determining including determining a type of relationship for each of the determined plurality of edges;
assigning each of the plurality of determined nodes a name and a node type based upon the gathered metadata, wherein a first set of the plurality of determined nodes are assigned a type based upon an automatic determination by the analytics application environment, wherein each of the plurality of nodes are respectively associated with a set of properties, wherein each set of properties are customizable based upon the assigned node type;
generating, based upon the determined plurality of nodes and the plurality of edges, a directed graph, the directed graph comprising the determined plurality of nodes and the determined plurality of edges;
displaying, as an interactive display, all or a portion of the generated directed graph via a user interface, said displaying further comprising an indication of each of the determined type of relationship for each of the determined plurality of edges, said display further comprising, as selectable options, an indication of each of the assigned node types assigned to each node and the respective set of properties for each node, wherein said indication of each assigned node type is displayed upon an indication of a selection of a node;
wherein access to the displayed portion of the generated directed graph, including the determined plurality of nodes and the determined plurality of edges, is restricted via an authentication level of a user accessing the displayed portion of the generated directed graph; and
wherein, based upon the connection, two of the plurality of determined nodes are determined as nearest neighbors, and, based upon said determination of the two of the plurality of nodes, a visualization comprising all artifacts to which the two nearest neighbor nodes have shared access to is displayed.

13. The non-transitory computer readable storage medium of claim 12, the steps further comprising:
receiving an indication of a user instruction via the user interface; and
modifying the display of the generated directed graph at the user interface.

14. The non-transitory computer readable storage medium of claim 12, wherein the metadata source comprises a data visualization.

15. The non-transitory computer readable storage medium of claim 12, wherein the metadata source comprises a metadata repository.

* * * * *